(12) United States Patent
Kung et al.

(10) Patent No.: US 11,754,189 B2
(45) Date of Patent: Sep. 12, 2023

(54) INFLATABLE SEAL

(71) Applicants: Chi-Yun Kung, Kaohsiung (TW); Wan-Rong Kung, Kaohsiung (TW)

(72) Inventors: Chi-Yun Kung, Kaohsiung (TW); Wan-Rong Kung, Kaohsiung (TW)

( * ) Notice: Subject to any disclaimer, the term of this patent is extended or adjusted under 35 U.S.C. 154(b) by 168 days.

(21) Appl. No.: 17/027,862

(22) Filed: Sep. 22, 2020

(65) Prior Publication Data
US 2022/0018445 A1    Jan. 20, 2022

(30) Foreign Application Priority Data
Jul. 16, 2020   (TW) .................................. 109124114

(51) Int. Cl.
| F16J 15/46 | (2006.01) |
| F16J 15/3272 | (2016.01) |
| F16J 15/3284 | (2016.01) |
| F16J 15/00 | (2006.01) |
| B63H 23/32 | (2006.01) |

(52) U.S. Cl.
CPC .......... F16J 15/46 (2013.01); F16J 15/3272 (2013.01); F16J 15/3284 (2013.01); *B63H 2023/327* (2013.01); *F16J 15/008* (2013.01)

(58) Field of Classification Search
CPC ...... F16J 15/002; F16J 15/008; F16J 15/3272; F16J 15/3284; F16J 15/3448; F16J 15/46; B63H 2023/327

See application file for complete search history.

(56) References Cited

U.S. PATENT DOCUMENTS

| 2,720,011 | A | * | 10/1955 | Krupp ................... | B64D 15/02 277/921 |
| 2,761,709 | A | * | 9/1956 | Gilbert, Sr. .......... | F16J 15/3448 277/540 |
| 2,797,972 | A | * | 7/1957 | Martin ..................... | F16J 15/46 277/467 |
| 2,832,618 | A | * | 4/1958 | Knoll ....................... | F16J 15/46 277/646 |
| 3,337,222 | A | * | 8/1967 | Smith ...................... | F16J 15/46 277/929 |
| 3,359,687 | A | * | 12/1967 | Wallace ................... | F16J 15/46 49/477.1 |
| 3,642,291 | A | * | 2/1972 | Zeffer ..................... | F16J 15/46 277/583 |

(Continued)

FOREIGN PATENT DOCUMENTS

| CN | 203348556 U | * | 12/2013 |
| CN | 203348556 U | | 12/2013 |

(Continued)

*Primary Examiner* — Nicholas L Foster
(74) *Attorney, Agent, or Firm* — Alan D. Kamrath; Karin L. Williams; Mayer & Williams PC

(57) ABSTRACT

An inflatable seal includes an annular body made of elastic material. The inflatable seal includes a chamber disposed in the annular body. The inflatable seal includes a fixing end and a movable end opposite to the fixing end in a cross section. The inflatable seal further includes first and second sides interconnected between the fixing end and the movable end and opposite to each other. The fixing end includes an annular lining disposed in the annular body. The sealing ability of the inflatable seal is improved in the axial direction and the radial direction.

11 Claims, 8 Drawing Sheets

(56) References Cited

U.S. PATENT DOCUMENTS

| | | | | |
|---|---|---|---|---|
| 3,689,082 | A | * | 9/1972 | Satterthwaite ........... F16J 15/46 277/516 |
| 3,788,651 | A | * | 1/1974 | Brown ..................... F16J 15/46 277/944 |
| 4,109,922 | A | | 8/1978 | Martin |
| 4,189,158 | A | * | 2/1980 | Roussin ................... F16J 15/46 277/389 |
| 4,373,377 | A | * | 2/1983 | Smith ..................... F16L 17/10 73/23.31 |
| 5,137,116 | A | | 8/1992 | Von Bergen et al. |
| 5,192,492 | A | * | 3/1993 | Gately .................... G21C 13/00 376/203 |
| 5,209,498 | A | * | 5/1993 | Colin ....................... E04B 2/82 277/921 |
| 5,961,128 | A | * | 10/1999 | Klammer ................ F16J 15/46 277/646 |
| 6,244,602 | B1 | * | 6/2001 | Farm ................... B01D 21/2433 210/511 |
| 8,366,116 | B2 | * | 2/2013 | Kung ................... F16J 15/3464 277/412 |
| 2009/0189353 | A1 | * | 7/2009 | Stokkan .................... F16J 15/46 277/334 |
| 2012/0020785 | A1 | * | 1/2012 | Kung .................. F16J 15/3464 415/230 |
| 2012/0306160 | A1 | * | 12/2012 | Koch ...................... B65G 15/54 277/558 |
| 2013/0292910 | A1 | * | 11/2013 | Tocheport ................ F16J 15/34 277/521 |

FOREIGN PATENT DOCUMENTS

| | | | |
|---|---|---|---|
| CN | 205654860 U | | 10/2016 |
| CN | 206377279 U | * | 8/2017 |
| JP | 2010060105 A | | 3/2010 |

* cited by examiner

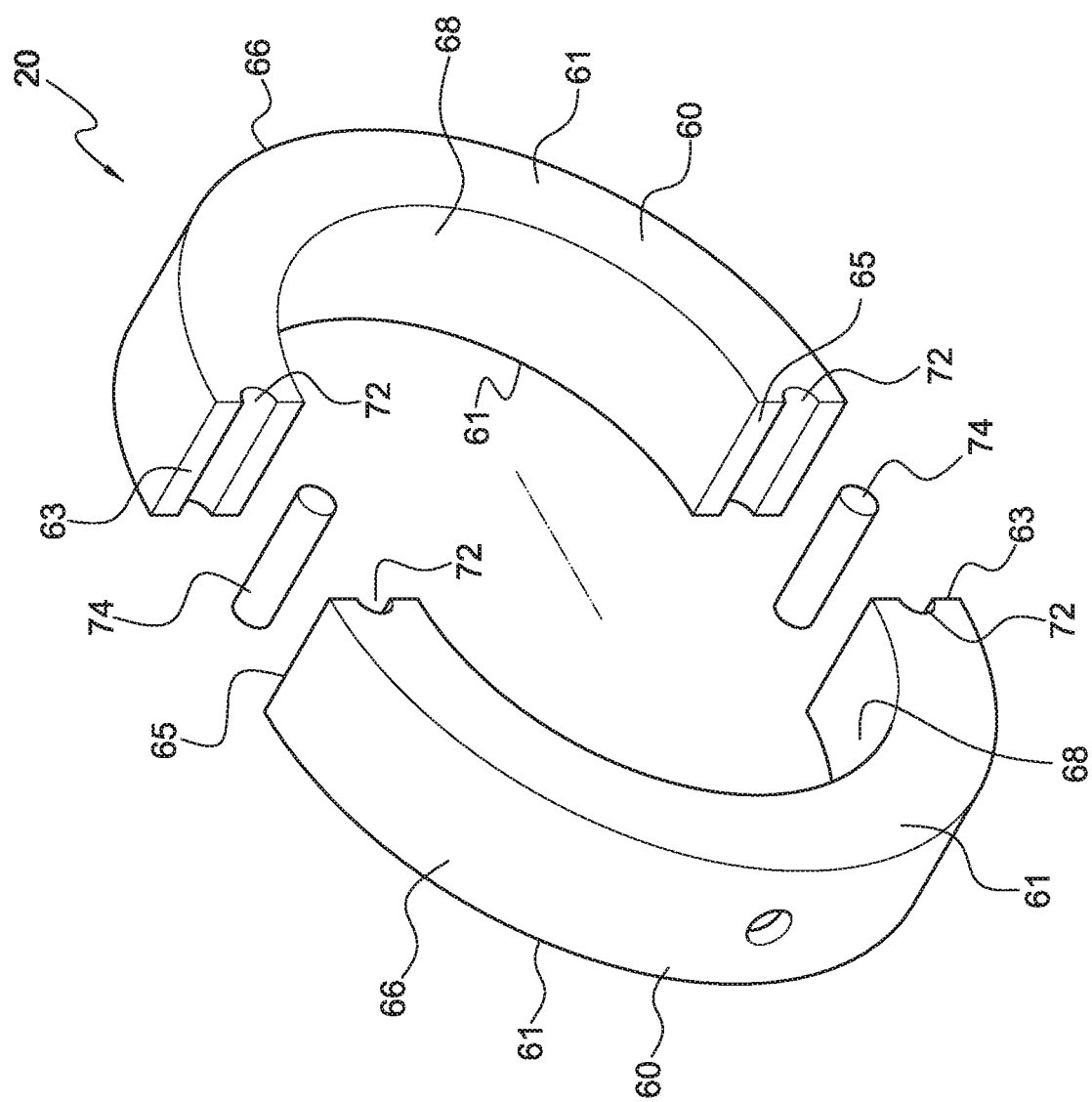

INFLATABLE SEAL

BACKGROUND OF THE INVENTION

The present invention relates to a seal that can be inflated to create a swelling, squeezing effect between two elements requiring sealing and particularly useful in a sealing device for a rotating shaft and, more particularly, to an inflatable seal for a propeller shaft for a boat or a submarine.

In a boat or a submarine using a propeller, the propeller shaft for mounting the propeller is below the water level and requires lubrication and cooling during operation. To prevent seawater from entering the boat or submarine along the propeller shaft, a sealing device is required between the propeller shaft and the hull.

FIG. 1 shows a conventional a shaft sealing device 100 including an annular first seal housing 160 and an annular second seal housing 150 which are disposed outside of the propeller shaft 300. A side of the first seal housing 160 is attached to a hull bulkhead 400 of the hull. Another side of the first seal housing 160 is coupled to the second seal housing 150. A side of the second seal housing 150 is coupled to a mating ring 140.

An annular recess of the first seal housing 160 forms an annular auxiliary sealing chamber 165 receiving an auxiliary seal ring 120. An annular recess of the second seal housing 150 forms an annular main sealing chamber 155 receiving a main seal ring 110. The main seal ring 110 and the auxiliary seal ring 120 are secured to an outer peripheral surface of the propeller shaft 300 to rotate therewith. A seal surface (sliding surface) 111 of the main seal ring 110 contacts with a side surface of the mating ring 140 to form a sealing mechanism. A seal surface (sliding surface) 121 of the auxiliary seal ring 120 contacts with a side surface of the second seal housing 150 to form another sealing mechanism.

Annular recesses having different radial depths are formed on an inner peripheral surface of the first seal housing 160. An inflatable seal 130 is fitted in the recess on the stem side. The inflatable seal 130 is sandwiched between a stem-side vertical surface of the first seal housing 160 and an inflation retainer 135 installed at a step portion on the inner peripheral surface of the first seal housing 160.

The inflatable seal 130 includes an annular chamber and is normally not in contact with the outer peripheral surface of the propeller shaft 300. Thus, the inflatable seal 300 has no wear in ordinary conditions. A tube 173 is disposed on the outer peripheral surface of the inflatable seal 130 and is configured to feed compressed air into the chamber of the inflatable seal 130. When leakage occurs due to wear of the main seal ring 110 and the auxiliary seal ring 120, the compressed air is delivered from the tube 173 into the chamber of the inflatable seal 130, such that the inflatable seal 130 inflates and expands radially to be in close contact with the outer peripheral surface of the propeller shaft 300 to avoid entrance of seawater, which is an emergent seal design. An example of the conventional shaft seal device 100 is a stem tube shaft sealing device disclosed in JP2010060105A.

However, the inflatable seal 130 becomes effective only when it is inflated to a rated pressure, and the axial and radial sealing functions are achieved under the air pressure. When the air pressure is not provided, seawater can easily leak into a gap between the inflatable seal 130 and the first seal housing 160 under the ambient water pressure. Crystallites are apt to be generated in the gap or alien objects are apt to enter the gap and could even erode the contact surface of the first seal housing 160, leading to risks of leakage during inflation of the inflatable seal 130. Furthermore, the inflatable seal 130 is made of elastic material, and the best inflation sealing of the inflatable seal 130 is obtained when the propeller shaft 300 stops. The main reason is that the outer peripheral surface of the rotating propeller shaft 300 contacted with the inflatable seal 130 generates a rotational shear force that tends to pull the body of the inflatable seal 130 to rotate. This adversely affects the contact force of the inflatable seal 130, and the inflatable seal 130 is apt to damage due to the improper rotational pulling force. Therefore, the inflatable seal 130 has limitations in the practice environments. Furthermore, the inflation extent of the inflatable seal 130 made of elastic material is not limited, such that an inflated portion expands towards the gap between the first seal housing 160 and the outer peripheral surface of the propeller shaft 300. As a result, the contact force between the inflatable seal 130 and the outer peripheral surface of the propeller shaft 300 is not uniform and, thus, adversely affects the sealing effect, and undesired wear occurs easily.

BRIEF SUMMARY OF THE INVENTION

In view of the above drawbacks of the conventional inflatable seal in use, the primary objective of the present invention is to provide an inflatable seal with improved sealing effect in the longitudinal direction and the radial direction and with a tough structure permitting use when subjected to a torsional force.

In a first aspect according to the present invention, an inflatable seal comprises an annular body made of elastic material. The inflatable seal comprises a chamber disposed in the annular body. The inflatable seal includes a fixing end and a movable end opposite to the fixing end in a cross section. The inflatable seal further includes first and second sides interconnected between the fixing end and the movable end and opposite to each other. The fixing end includes an annular lining disposed in the annular body.

In an example, the annular lining includes a first edge adjacent to the first side and a second edge adjacent to the second side. Each of the first and second edges has a rib. The ribs are disposed in the first and second sides, respectively.

In an example, the movable end has a reinforcing layer therein.

In an example, the reinforcing layer extends into the first side and the second side.

In an example, the reinforcing layer is securely connected to the annular lining.

In an example, the annular body of the inflatable seal surrounds an axial direction. The fixing end and the movable end are opposite to each other in a radial direction perpendicular to the axial direction. The movable end is formed on an inner ring portion of the annular body of the inflatable seal.

In an example, the annular body of the inflatable seal surrounds an axial direction, and the fixing end and the movable end are opposite to each other in the axial direction.

In an example, the fixing end includes an air hole intercommunicating with the chamber.

In a second aspect according to the present invention, an inflatable seal comprises an annular body made of elastic material. The inflatable seal comprises a chamber disposed in the annular body. The inflatable seal includes a fixing end and a movable end opposite to the fixing end in a cross section. The inflatable seal further includes first and second sides interconnected between the fixing end and the movable end and opposite to each other. The movable end has a reinforcing layer therein.

In an example, the reinforcing layer extends into the first side and the second side.

In an example, the annular body of the inflatable seal surrounds an axial direction. The fixing end and the movable end are opposite to each other in a radial direction perpendicular to the axial direction. The movable end is formed on an inner ring portion of the annular body of the inflatable seal.

In an example, the annular body of the inflatable seal surrounds an axial direction, and the fixing end and the movable end are opposite to each other in the axial direction.

In an example, the fixing end includes an air hole intercommunicating with the chamber.

In a third aspect according to the present invention, an inflatable seal comprises an annular body that is circular. The inflatable seal is comprised of at least two arcuate bladders which are arcuate, identical to each other, and coupled to each other. Each of the at least two bladders includes a chamber separating the bladder, such that the bladder has an outer arcuate portion, an inner arcuate portion spaced from the outer arcuate portion in a radial direction, two sides spaced from each other in an axial direction perpendicular to the radial direction, and first and second ends spaced from each other in an arcuate extending direction of the bladder. The outer arcuate portion has an air hole intercommunicating with the chamber. Each of the at least two bladders includes a lining enveloped in the outer arcuate portion thereof. Each air hole extends through a respective lining.

In an example, in a cross section of each of the at least two bladders, the inner arcuate portion of the bladder includes first and second inner edges respectively at the first and second ends, a first radius extending from a center of the bladder to the first inner edge, and a second radius extending from the center of the bladder to the second inner edge. The first inner edge is located in an angular area between the first radius and the second radius. The second inner edge is located outside of the angular area between the first radius and the second radius. The first end of each bladder has an end face at an angle to the first radius. The second end of each bladder has an end face at the angle to the second radius.

In an example, each of the at least two bladders has a female coupling portion at the first end thereof and a male coupling portion at the second end thereof. The male coupling portion of each of the at least two bladders is coupled with the female coupling portion of another of the at least two bladders.

In an example, each of the first and second ends of each of the at least two bladders has a through-groove which extends in an axial direction or a radial direction of the bladder. A resilient plug is inserted into the through-holes at the first and second ends of two bladders after coupling.

In an example, the inner arcuate portion of each of the at least two bladders has a reinforcing layer therein.

In an example, the reinforcing layer of the inner arcuate portion of each of the at least two bladders extends into the two sides of the bladder.

The present invention will become clearer in light of the following detailed description of illustrative embodiments of this invention described in connection with the drawings.

DESCRIPTION OF THE DRAWINGS

FIG. 8 is an exploded, perspective view of an inflatable seal of yet another embodiment according to the present invention, with the inflatable seal comprised of two bladders.

DETAILED DESCRIPTION OF THE INVENTION

Figure 1:
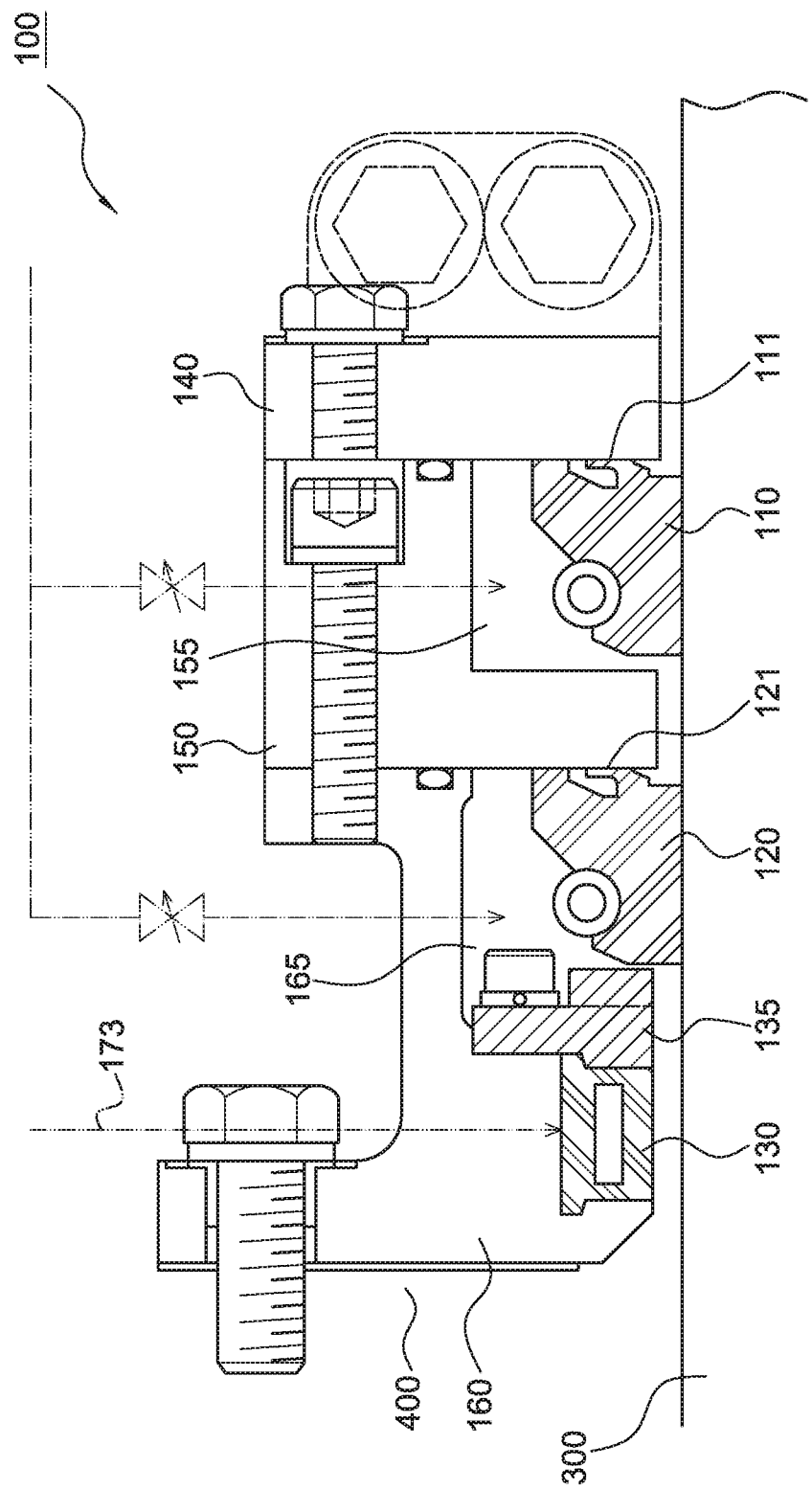
FIG. 1 is a diagrammatic view of a conventional shaft sealing device.
Figure 2:
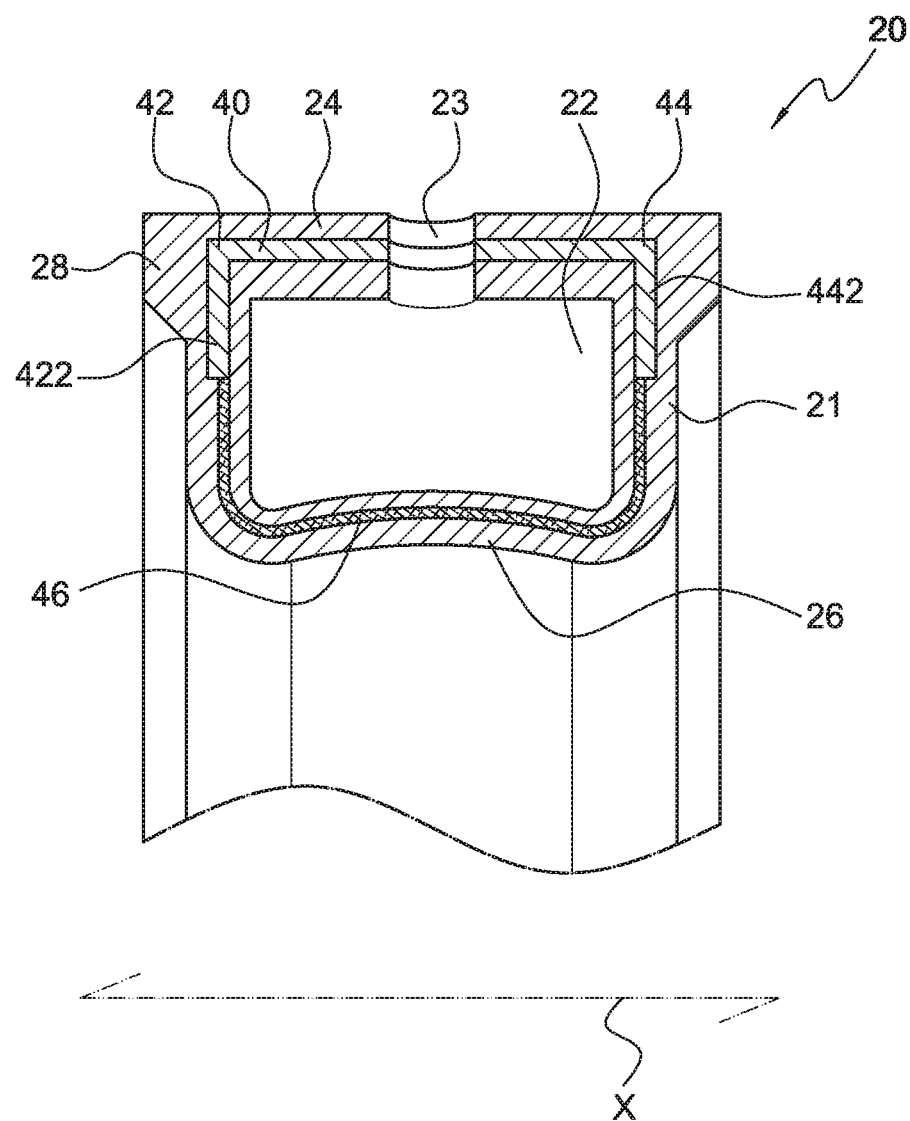
FIG. 2 is a partial, cross sectional view of an inflatable seal of an embodiment according to the present invention.

With reference to FIG. 2, an inflatable seal 20 of an embodiment according to the present invention includes a body having a chamber 22. According to the form shown, the body is annular, and the inflatable seal 20 is annular and surrounds an axial direction X (or a lateral direction). The chamber 22 is annularly disposed in the body and includes at least one air hole 23 intercommunicating the chamber 22 with the outside. As shown in the cross sectional view of FIG. 2, the chamber 22 is disposed in the body forming the inflatable seal 20 and separates the inflatable seal 20, such that the inflatable seal 20 has a fixing end 24, a movable end 26 opposite to the fixing end 24, and opposite first and second sides 28 and 21 interconnected between the fixing end 24 and the movable end 26. In the embodiment shown in FIG. 2, a propeller shaft of a boat or a submarine is mounted in an inner ring portion of the inflatable seal 20. The fixing end 24 extends in a radial direction (or a longitudinal direction) perpendicular to the axial direction X and is disposed on an outer ring portion of the body of the inflatable seal 20. The movable end 26 is spaced from the fixing end 24 in the radial direction and is disposed to the inner ring portion of the body of the inflatable seal 20. The first side 28 and the second side 21 are spaced from each other in the axial direction X. The at least one air hole 23 is formed in the fixing end 24.

An annular, rigid lining 40 is disposed in the body of the inflatable seal 20 and has a contour corresponding to the body of the inflatable seal 20. According to the form shown, the lining 40 is disposed in the fixing end 24, and the at least one air hole 23 extends through the lining 40. The lining 40 is configured to couple with an air duct and is configured to prevent the at least one air hole 23 from deformation due to axial compression. The lining 40 includes a first edge 42 and a second edge 44 spaced from the first edge 42 in a width direction of the inflatable seal 20. The first edge 42 is adjacent to the first side 28. The second edge 44 is adjacent to the second side 21. With the construction of the lining 40, the whole inflatable seal 20 can withstand axial compression to increase the axial sealing ability of the inflatable seat 20. In an example, the first edge 42 has a rib 422, and the second edge 44 has a rib 442. The ribs 422 and 442 increase the abutting force of the lining 40. According to the form shown, the ribs 422 and 442 are disposed in the first side 28 and the second side 21, respectively.

In an embodiment, the movable end 26 of the inflatable seal 20 annularly envelops a reinforcing layer 46 which can be a winding layer or weaving layer of steel wires or nylon wires. In a workable example, the reinforcing layer 46 has a U-shaped cross section and extends into the first side 28 and the second side 21. Furthermore, the reinforcing layer 46 has two ends coupled to the first and second edges 42 and 44 of the lining 40 by the first and second sides 28 and 21 or coupled to the ribs 422 and 442.

Provision of the reinforcing layer 46 increases the supporting strength and the tensile strength of the inflatable seal 20, such that when the inflatable seal 20 is being inflated, the movable end 26 will not have undue expansion and undue deformation. With the reinforcing layer 46 disposed in the first and second sides 28 and 21, the inflatable seal 20 has a better structural strength to resist rotational pulling resulting from contact with an outer peripheral surface of a rotating propeller shaft. Thus, when the inflatable seal 20 operates to provide the sealing function, the propeller shaft can still rotate to keep the running ability of the boat or submarine. Accordingly, the inflatable seal 20 according to the present invention in practice is not limited to the operating conditions of the propeller shaft.

Figure 3:
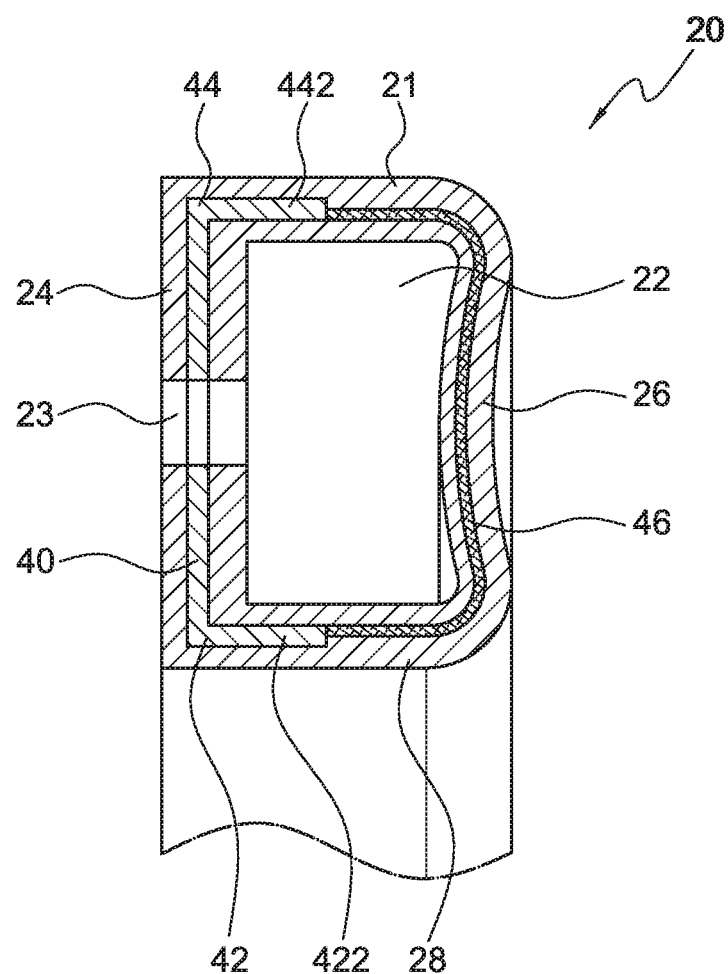
FIG. 3 is a partial, cross sectional view illustrating another example of the inflatable seal of FIG. 2.

Based on the disclosure of U.S. Pat. No. 5,137,116 A entitled "SEALING DEVICE FOR A ROTATING SHAFT OF A SHIP PROPELLER SHAFT", in addition to the sealing practice of the inflatable seal extending in a radial direction, the inflatable seal can achieve the sealing operation when extending in an axial direction. As shown in FIG. 3, the fixing end 24 and the movable end 26 are spaced from each other in the axial direction X, and the first and second sides 28 and 21 are spaced from a radial direction perpendicular to the axial direction X and form the outer ring portion and the inner ring portion of the body of the inflatable seal 20, respectively. The lining 40 is annularly disposed in the fixing end 24. The reinforcing layer 46 is annularly disposed in the movable end 26 and extends between the first and second sides 28 and 21. Two ends of the reinforcing layer 46 can be coupled to the first and second edges 42 and 44 of the lining 40 by the first and second sides 28 and 21.

CN 203348556 U entitled "STERN SHAFT ROTATABLE PRESSURIZED SEALING RING" discloses a pneumatic sealing ring comprised of two identical bladders. CN 205654860 entitled "PLURAL SECTION TYPE PNEUMATIC TIRE SEALING FOR PROPELLER SHAFT" discloses a pneumatic tire sealing structure including two semi-circle rubber tires. The preceding amount of two end faces of each semi-circle rubber tire is between 0.5 mm and 1.5 mm. The reinforcement amount at the inner side of each end is between 1 mm and 4 mm. The pressing design based on the mating sizes increases the coupling fittingness after assembly and the fittingness in axial stretching.

Figure 4:
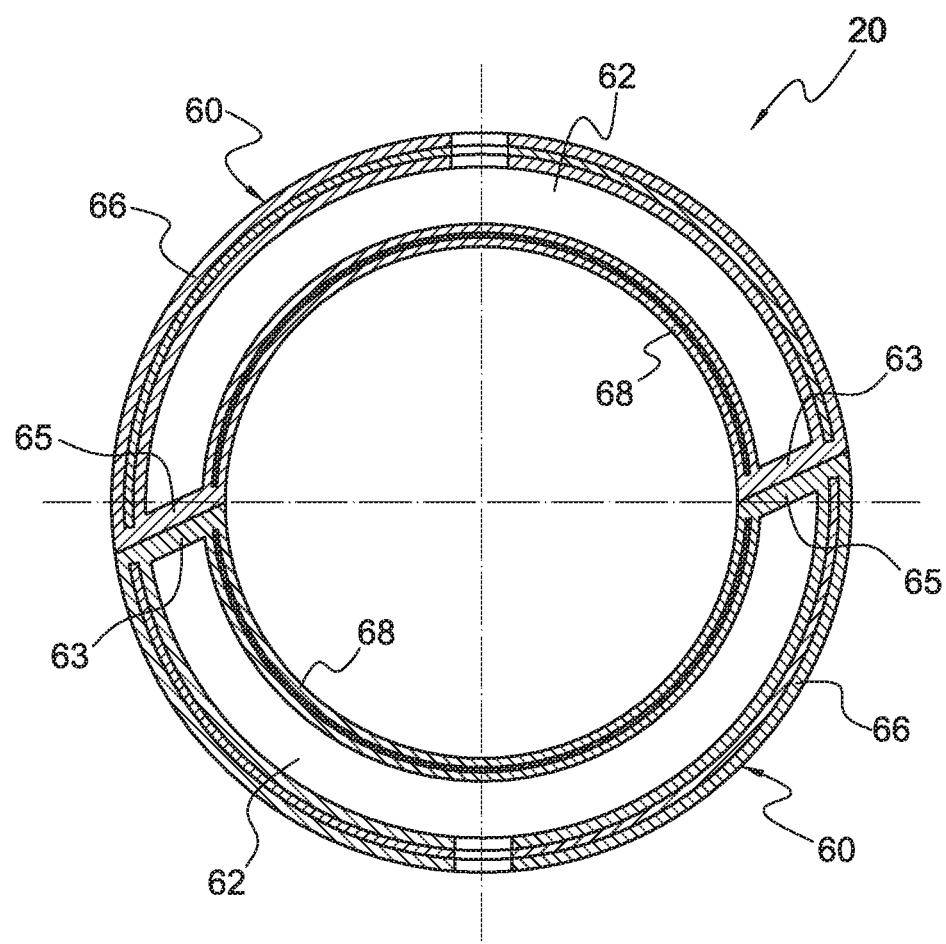
FIG. 4 is a cross sectional view illustrating an inflatable seal of another embodiment according to the present invention, with the inflatable seal comprised of two bladders.
Figure 5:
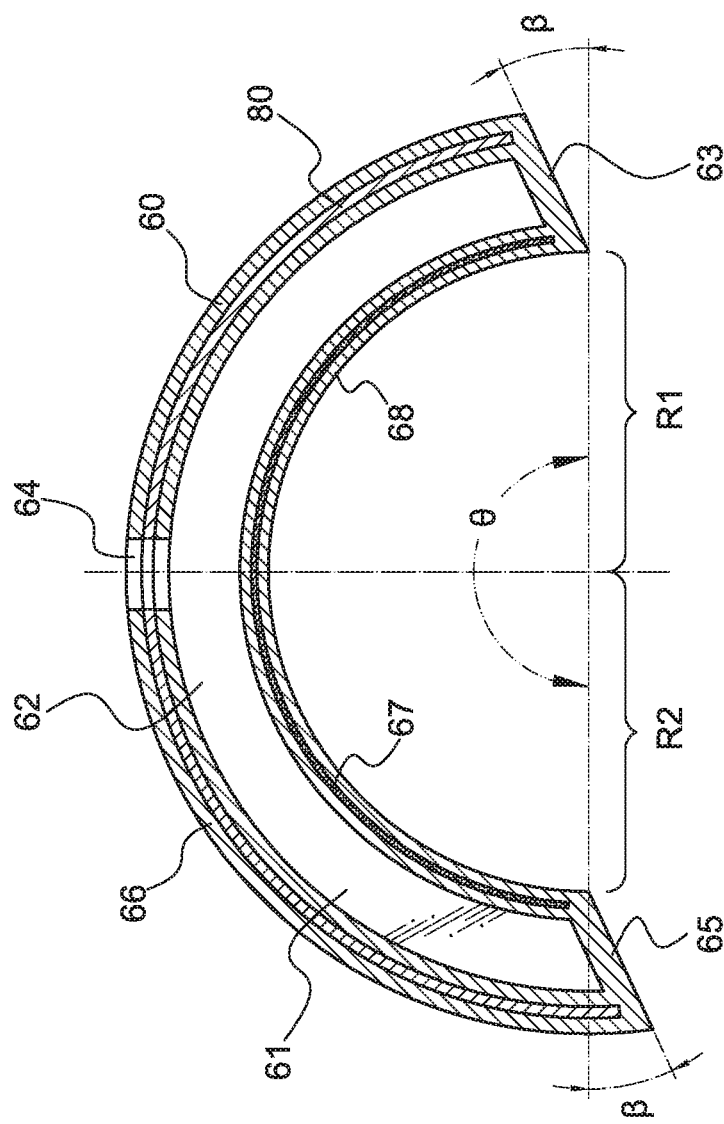
FIG. 5 is a cross sectional view of one of the two bladders of FIG. 4.

In an alternative embodiment, the inflatable seal 20 is in the form of a circular, ring-shaped member comprised of at least two arcuate, elastic bladders 60 having an identical arc length and which are coupled to each other, as shown in FIGS. 4 and 5 which are drafted not according to the actual sizes. Each bladder 60 is hollow and includes a chamber 62 having at least one air hole 64 intercommunicating the chamber 62 with the outside.

The chambers 62 are formed in the body of the bladders 60, and each bladder 60 includes an outer arcuate portion 66, an inner arcuate portion 68, two opposite sides 61 in the axial direction, and first and second ends 63 and 65 extending between the two opposite sides 61 and located at two ends of the body in the arcuate extending direction. In a cross section of each bladder 60, the inner arcuate portion 68 of the bladder 60 includes first and second inner edges respectively at the first and second ends 63 and 65, a first radius R1 extending from a center of the bladder 60 to the first inner edge, and a second radius R2 extending from the center of the bladder 60 to the second inner edge. The first inner edge is located in an angular area (see inner angle θ in FIG. 5) between the first radius R1 and the second radius R2. The second inner edge is located outside of the angular area between the first radius R1 and the second radius R2. The first end 63 of each bladder 60 has an end face at an angle β to the first radius. The second end 65 of each bladder 60 has an end face at the angle β to the second radius. The first end 63 of each of the two bladders 60 is connected to the second end 65 of the other bladder 60 to from a circular pneumatic seal (the inflatable seal 20). Since the first and second ends 63 and 65 have the same inclining angle β, when each bladder 60 is being inflated, the two bladders 60 can still have a radial expansion at each connection between the respective first and second ends 63 and 65. Thus, each connection of the respective first and second ends 63 and 65 of the two bladders 60 can still effectively contact with the outer peripheral surface of the propeller shaft 300.

Based on the above technical feature of the present invention, each of the two bladders 60 can include a rigid lining 80 enveloped in the outer arcuate portion 66 and a reinforcing layer 67 in the inner arcuate portion 68. The reinforcing layer 67 extends between the two sides 61. Furthermore, the reinforcing layer 67 can be securely connected to the lining 80.

Figure 6:
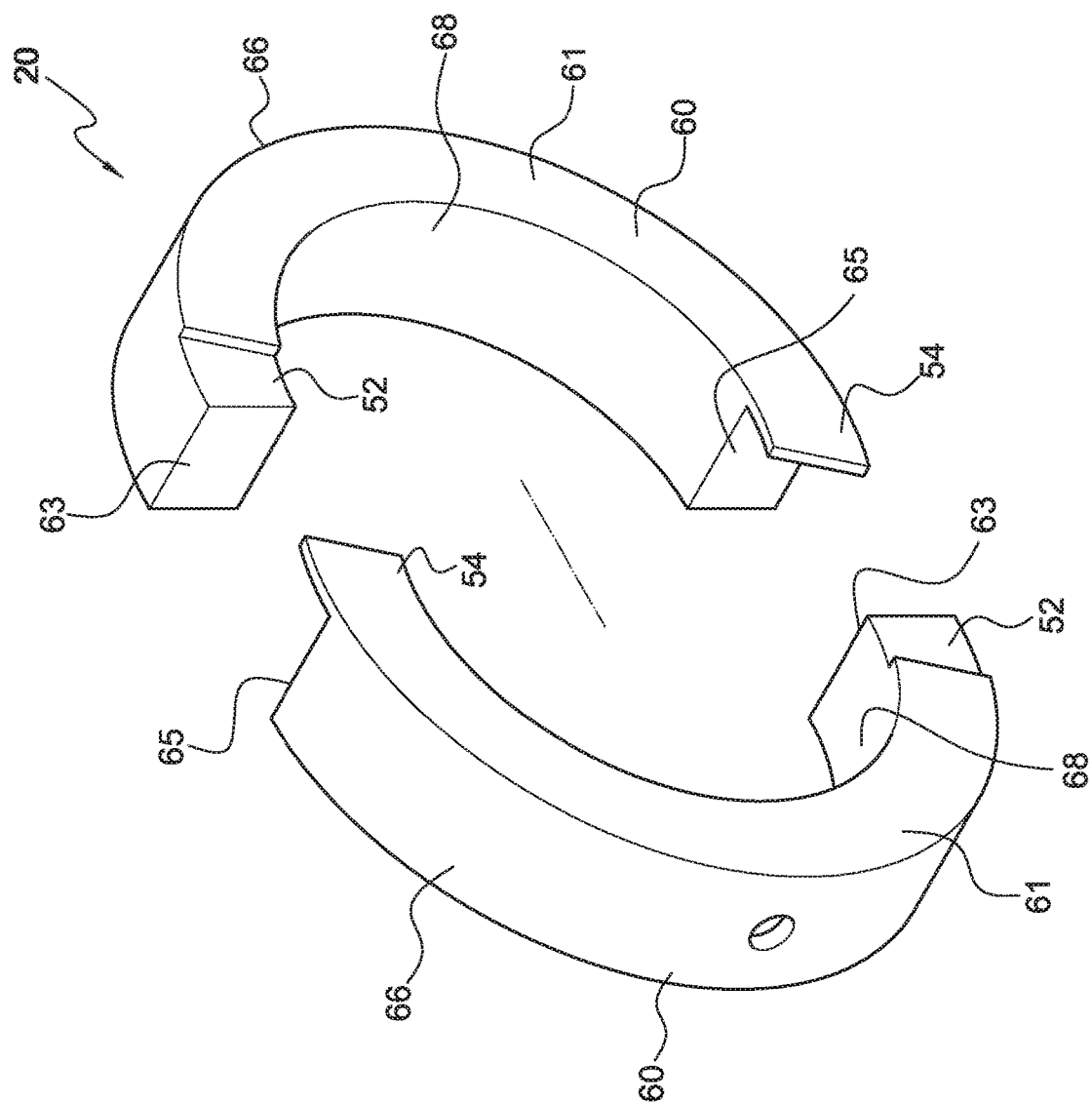
FIG. 6 is an exploded, perspective view of an inflatable seal of a further embodiment according to the present invention, with the inflatable seal comprised of two bladders.
Figure 7:
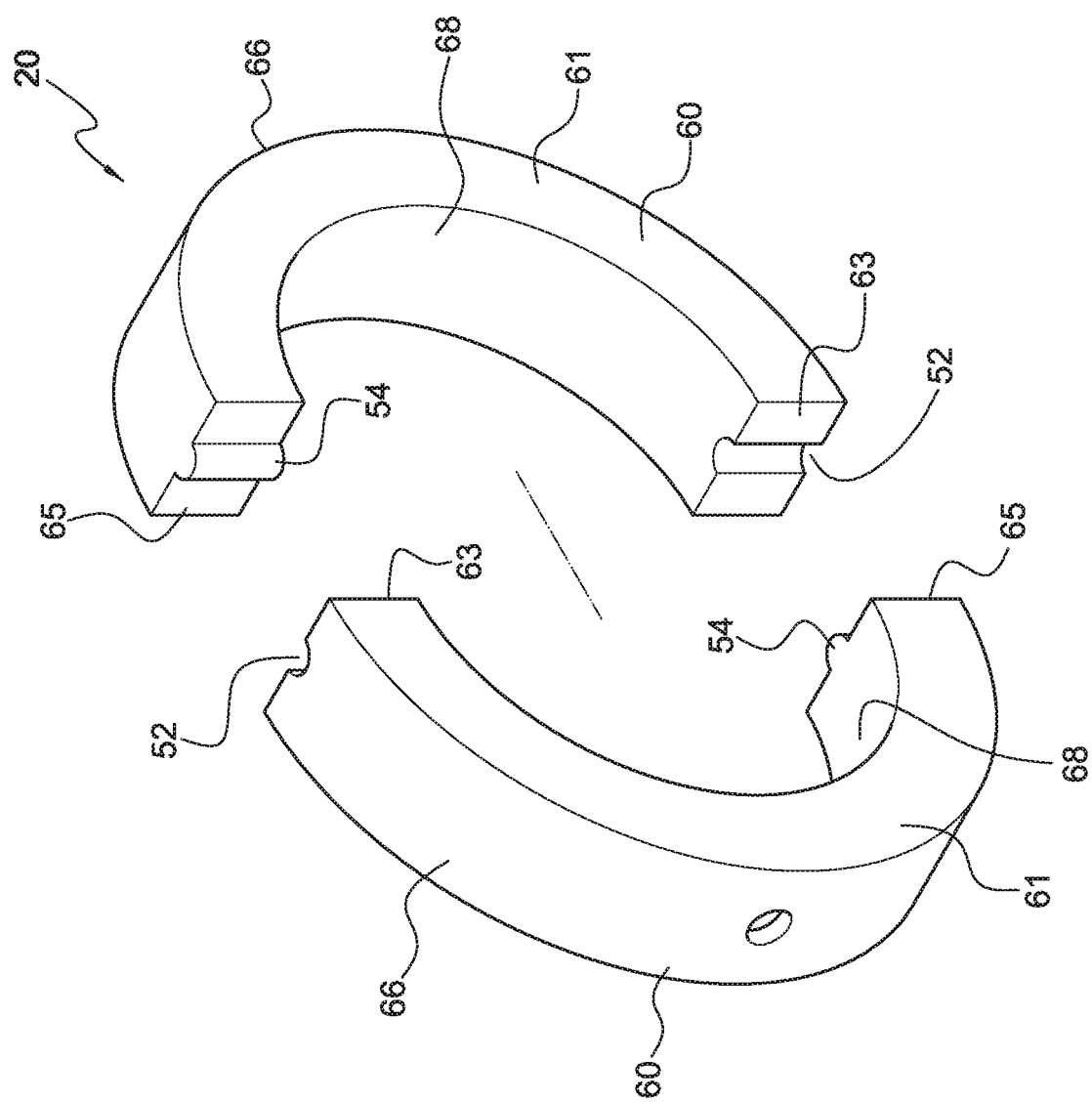
FIG. 7 is an exploded, perspective view of an inflatable seal of still another embodiment according to the present invention, with the inflatable seal comprised of two bladders.

FIGS. 6 and 7 show other embodiments of at least two arcuate elastic bladders 60 coupled to form the pneumatic seal (the inflatable seal 20). Each bladder 60 includes an outer arcuate portion 66 and an inner arcuate portion 68 spaced from the outer arcuate portion 66 in the radial direction. Each bladder 60 includes two sides 61 spaced from each other in the axial direction and first and second ends 63 and 65 extending between the two opposite sides 61 and located at two ends of the body in the arcuate extending direction. The first end 63 of each bladder 60 has a female coupling portion 52. The second end 65 of each bladder 60 has a male coupling portion 54 for coupling the female coupling portion 52 of the other bladder 60.

In the embodiment shown in FIG. 6, one of the two sides 61 of each bladder 60 has a stepped female coupling portion 52 at the first end 63. The second end 65 of each bladder 60 facing the stepped female coupling portion 52 has a mating female coupling portion 54 extending in the arcuate direction and coupled with the stepped female coupling portion 52. When the bladders 60 are coupled with each other, each stepped female coupling portion 52 is coupled with the respective male coupling portion 54 to provide an improved sealing performance at the connections between the two bladders 60 when an axial fixing force is applied to the connections.

In the embodiment shown in FIG. 7, the first end 63 of each bladder 60 has a female coupling portion 52 in the form of an axially extending or radially extending groove. According to the form shown, the female coupling portion 52 in the form of a groove extends radially between the outer arcuate portion 66 and the inner arcuate portion 68. The second end 65 of each bladder 60 has a protruding, male coupling portion 54 for coupling with a respective female coupling portion 52. The mating arrangement increases the sealability at the connections.

In a further embodiment shown in FIG. 8, each of the first and second ends 63 and 65 of each bladder 60 has a through-groove 72. The through-groove 72 is disposed in the first and second ends 63 and 65 and extends in an axial direction or a radial direction of the bladder 60. In this embodiment, each through-groove 72 extends from one of the two sides 61 through the other side 61 in the axial direction of the bladder 60. Nevertheless, each through-groove 72 can extend between the outer arcuate portion 66 and the inner arcuate portion 68 in the radial direction of the bladder 60. A resilient plug 74 is inserted into the through-holes 72 at the respective first and second ends 63 and 65 of the bladders 60 after coupling, increasing the sealability of the connections of the two bladders 60.

Although the inflatable seal 20 according to the present invention is used on a propeller in this disclosure, other applications of the inflatable seal 20 is still possible. For example, the inflatable seal 20 according to the present invention can be used on two static planar units, such as the sealing device for a vacuum enclosure disclosed in U.S. Pat. No. 4,109,922 A.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A inflatable seal comprising an annular body made of elastic material, wherein the inflatable seal comprises a chamber disposed in the annular body, wherein the inflatable seal includes a fixing end and a movable end opposite to the fixing end in a cross section, wherein the inflatable seal further includes first and second sides interconnected between the fixing end and the movable end and opposite to each other, wherein the fixing end includes an annular, rigid lining enveloped in the annular body, wherein the fixing end further includes an air hole intercommunicating with the chamber and extending through the annular, rigid lining, wherein the annular, rigid lining is totally enveloped in the annular body except for at the air hole, wherein the annular, rigid lining includes a first edge adjacent to the first side and a second edge adjacent to the second side, wherein each of the first and second edges has a rib, and wherein the ribs are disposed in the first and second sides, respectively.

2. A inflatable seal comprising an annular body made of elastic material, wherein the inflatable seal comprises a chamber disposed in the annular body, wherein the inflatable seal includes a fixing end and a movable end opposite to the fixing end in a cross section, wherein the inflatable seal further includes first and second sides interconnected between the fixing end and the movable end and opposite to each other, wherein the fixing end includes an annular, rigid lining enveloped in the annular body, wherein the fixing end further includes an air hole intercommunicating with the chamber and extending through the annular, rigid lining, wherein the annular, rigid lining is totally enveloped in the annular body except for at the air hole, wherein the movable end has a reinforcing layer annularly disposed therein.

3. The inflatable seal as claimed in claim 2, wherein the reinforcing layer extends into the first side and the second side.

4. The inflatable seal as claimed in claim 3, wherein the reinforcing layer is securely connected to the annular, rigid lining.

5. The inflatable seal as claimed in claim 2, wherein the annular body of the inflatable seal surrounds an axial direction, wherein the fixing end and the movable end are opposite to each other in a radial direction perpendicular to the axial direction, and wherein the movable end is formed on an inner ring portion of the annular body of the inflatable seal.

6. The inflatable seal as claimed in claim 2, wherein the annular body of the inflatable seal surrounds an axial direction, and wherein the fixing end and the movable end are opposite to each other in the axial direction.

7. A inflatable seal comprising an annular body that is circular, wherein the inflatable seal is comprised of at least two arcuate bladders which are arcuate, identical to each other, and coupled to each other, wherein each of the at least two bladders includes a chamber defining the respective bladder, such that each bladder has an outer arcuate portion, an inner arcuate portion spaced from the outer arcuate portion in a radial direction, two sides spaced from each other in an axial direction perpendicular to the radial direction, and first and second ends spaced from each other in an arcuate extending direction of the respective bladder, wherein the outer arcuate portion of each bladder has an air hole intercommunicating with the chamber, wherein each of the at least two bladders includes a rigid lining enveloped in the outer arcuate portion thereof, wherein each air hole extends through a respective one of the rigid linings, wherein each of the rigid linings is totally enveloped in the outer arcuate portion of the bladder except for at the air hole, wherein the inner arcuate portion of each of the at least two bladders has a reinforcing layer therein.

8. The inflatable seal as claimed in claim 7, wherein in a cross section of each of the at least two bladders, the inner arcuate portion of the bladder includes first and second inner edges respectively at the first and second ends, a first radius extending from a center of the bladder to the first inner edge, and a second radius extending from the center of the bladder to the second inner edge, wherein the first inner edge is located in an angular area between the first radius and the second radius, wherein the second inner edge is located outside of the angular area between the first radius and the second radius, wherein the first end of each bladder has an end face at an angle to the first radius, and wherein the second end of each bladder has an end face at the angle to the second radius.

9. The inflatable seal as claimed in claim 7, wherein each of the at least two bladders has a female coupling portion at the first end thereof and a male coupling portion at the second end thereof, and wherein the male coupling portion of each of the at least two bladders is coupled with the female coupling portion of another of the at least two bladders.

10. The inflatable seal as claimed in claim 7, wherein each of the first and second ends of each of the at least two bladders has a through-groove which extends in an axial direction or a radial direction of the bladder, wherein a resilient plug is inserted into the through-grooves at the first and second ends of two bladders after coupling.

11. The inflatable seal as claimed in claim 7, wherein the reinforcing layer of the inner arcuate portion of each of the at least two bladders extends into the two sides of the bladder.

\* \* \* \* \*